March 13, 1951 P. H. THAM, ET AL 2,544,864
CAMERA HAVING CURVED FILM PLANE TO ELIMINATE DISTORTION
Filed Sept. 23, 1947
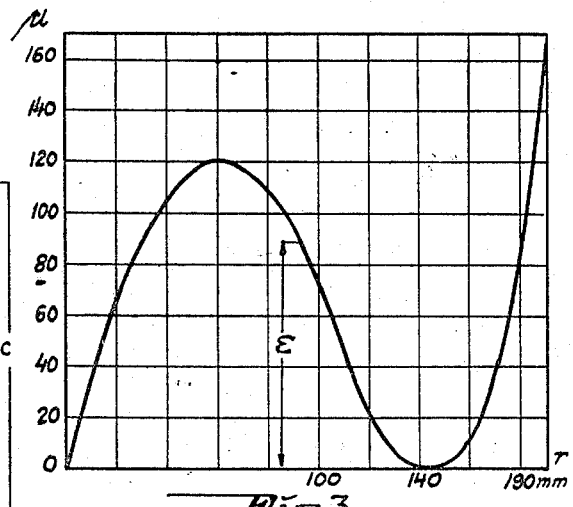
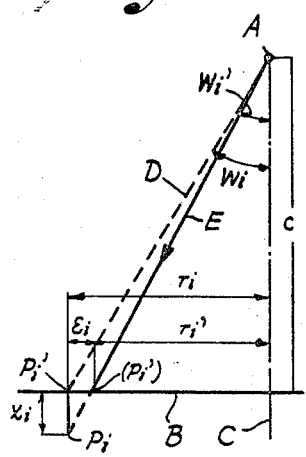
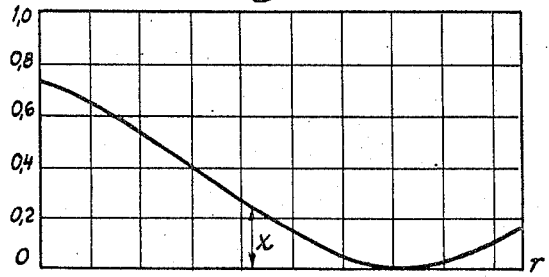
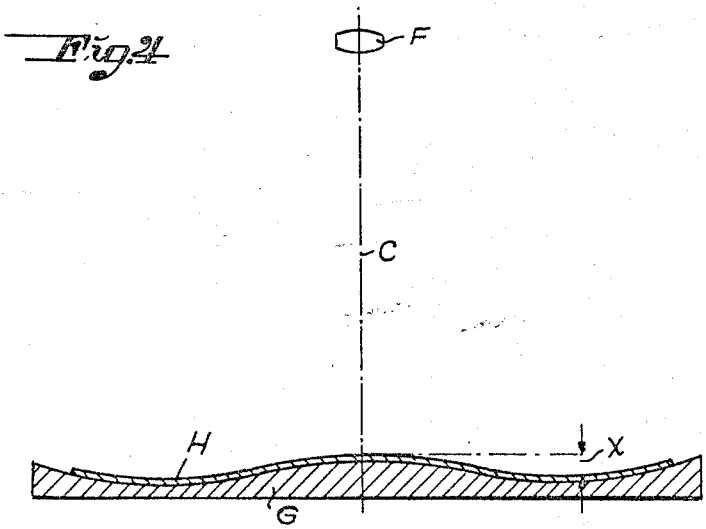
INVENTORS
Percy Harry Tham
Frey Samsioe
ATTORNEY Patented Mar. 13, 1951

2,544,864

UNITED STATES PATENT OFFICE 2,544,864

CAMERA HAVING CURVED FILM PLANE TO ELIMINATE DISTORTION

Percy Harry Tham and Frey Samsioe, Stockholm, Sweden

Application September 23, 1947, Serial No. 775,614
In Sweden October 5, 1946

1 Claim. (Cl. 95—11)

This invention relates to cameras, particularly for photogrammetric purposes, and has for its object to eliminate the inconvenience arising from the lens distortion occurring in the objective, which distortion especially in wide-angle objectives amounts to considerable values and even in normal-angle objectives may obtain values which have to be compensated for. From the point of view of accuracy, the development, especially in photogrammetry, can be expected to result in that even magnitudes of lens distortion hitherto neglected will become of practical significance.

In the photogrammetric stereo-measurement efforts have been made hitherto to redirect the pencil of rays distorted by the camera objective by subjecting the rays to a compensating refraction in the stereo-instrument either by means of an objective especially designed for that purpose or by means of a compensating plate serving the same purpose, to the effect that the resultant pencil of rays shall correspond to the pencil of rays which during photographing enter the objective of the camera. This method suffers, however, from the inconvenience that the camera and the stereo-instrument have to be exactly fitted to each other in optical respects, with the consequence that a certain stereo-instrument can be used for pictures only which have been produced in a certain type of camera. It is further well known to compensate lens distortions in a numerical way by means of height correction nomograms.

All of the above named methods are based on films impaired by lens distortion, and aim to correct or compensate the lens distortion in the stereo-measurement or reproduction. In contrast thereto, our present invention has for its object to provide an arrangement for eliminating the lens distortion effect on the film and thus to ensure the production of negatives free from the distortion effect and adapted to be reproduced or stereo-treated in normal instruments which need not be provided with compensating devices and consequently can be used irrespective of the type of camera used in photographing. Due to the arrangement according to the invention, reprojecting operations are entirely avoided which otherwise would result in optical losses and, consequently, in impaired pictures. The importance thereof will be evident, as in most cases the negatives obtained in the camera are directly placed into the stereo-instrument without any reprojecting operation as to the size of the picture.

We attain the above-named object by the arrangement described below with reference to the accompanying drawing, in which:

Fig. 1 diagrammatically illustrates the principle on which our invention is based; Figs. 2 and 3 show various diagrams; and Fig. 4 diagrammatically illustrates a sectional view of a film support plate devised in accordance with our invention, the height scale being largely exaggerated for the sake of clearness.

The influence of the lens distortion will be apparent from Fig. 1 in which the reference letter A denotes the inner projection center of the objective, B the plane of the image, and C the optical axis. $c$ denotes the camera-constant, that is the distance between the inner projection center of the objective and the plane of the image. A certain ray of light which theoretically would strike the plane B at point $P_i'$, will be deflected, due to lens distortion, as indicated at E such as to fall on point $(P_i')$. The magnitude of the radial lens distortion is indicated by $\epsilon_i$. Now, according to our invention, the support plate for the film is shaped in such a manner that point $(P_i')$ will be displaced into the position indicated at $P_i$, the distance $c$ for said point being increased to $(c+x_i)$. As a consequence thereof, the deflected ray of light E will strike the film at the same distance $(r_i'+\epsilon_i)$ from the optical axis C as would the theoretically correct ray D. Using the symbols shown in Fig. 1, it follows that tan $$\omega_i \approx \tan \omega_i' = \frac{\epsilon_i}{x_i} = \frac{r_i}{c}$$

and generally $$x = c\frac{\epsilon}{r}$$

The supporting plate for the film can thus be shaped in a manner such that the image of any point in spite of the lens distortion will be located at the correct distance from the optical axis, and as a result thereof, the ray of light will strike the film exactly at the same radial distance as if the objective were free from lens distortion. It will be obvious that for each ray of light which is distorted inwardly towards the center of the image, the corresponding point of the support plate has to be lowered, and vice versa.

The magnitude of the lens distortion $\epsilon$ in an objective having a camera-constant of 200 millimeters is illustrated in Fig. 2 in which the abscissae represent the radial distance $r$ from the optical axis and the ordinates represent radial lens distortion $\epsilon$.

If $x$ is calculated according to the above equation as a function of different radial distances $r$, the curve shown in Fig. 3 will be obtained, representing the shape of the film abutting face of the support plate necessary to entirely eliminate the effect of lens distortion.

In Fig. 4, there is diagrammatically illustrated a support plate G curved in the manner indicated, the section being taken along a plane through the optical axis C. Reference letter H indicates a film resting on the support plate, and the objective is diagrammatically indicated at F. It should be noted that for the sake of clearness the scale of the axial distance $x$ from the uncorrected plane of the image is largely exaggerated in Fig. 4. As will be seen from Fig. 3, said distance amounts, in the example shown, at the most to somewhat below one millimeter.

What we claim is:

In a camera, an objective and a support plate for the light-sensitive film, the film abutting face of said support plate being shaped such that the line of intersection of the light-sensitive face of the film and a plane through the optical axis satisfies the equation $$x = c\frac{\epsilon}{r} \text{ where } x$$

denotes the axial distance from the uncorrected plane of the image, $c$ the camera-constant, that is, the distance between the inner projection center of the objective and the plane of the image, $\epsilon$ the radial lens distortion, and $r$ the radial distance from the optical axis to the point of intersection of the ray of light and the uncorrected plane of the image.

PERCY HARRY THAM.
FREY SAMSIOE.

REFERENCES CITED

The following references are of record in the file of this patent:

UNITED STATES PATENTS

| Number | Name | Date |
|---|---|---|
| 1,082,678 | Casler | Dec. 30, 1913 |
| 1,975,678 | Bertele | Oct. 2, 1934 |
| 1,987,878 | Tronnier | Jan. 15, 1935 |
| 2,049,041 | Berggren | July 28, 1936 |
| 2,391,114 | Aklin | Dec. 18, 1945 |
| 2,403,660 | Hayward | July 9, 1946 |

FOREIGN PATENTS

| Number | Country | Date |
|---|---|---|
| 7,661 | Great Britain | 1906 |